(12) United States Patent
Doherty et al.

(10) Patent No.: US 9,965,474 B2
(45) Date of Patent: May 8, 2018

(54) DYNAMIC SUMMARY GENERATOR

(71) Applicant: Google LLC, Mountain View, CA (US)

(72) Inventors: Ryan P. Doherty, San Jose, CA (US); Nicolaus T. Mote, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 536 days.

(21) Appl. No.: 14/505,107

(22) Filed: Oct. 2, 2014

(65) Prior Publication Data

US 2016/0098397 A1   Apr. 7, 2016

(51) Int. Cl.
G06F 7/02 (2006.01)
G06F 17/30 (2006.01)

(52) U.S. Cl.
CPC .. G06F 17/30011 (2013.01); G06F 17/30424 (2013.01); G06F 17/30699 (2013.01); G06F 17/30719 (2013.01); G06F 17/30867 (2013.01)

(58) Field of Classification Search
None
See application file for complete search history.

(56) References Cited

U.S. PATENT DOCUMENTS

| | | | |
|---|---|---|---|
| 5,708,825 A | 1/1998 | Sotomayor | |
| 6,205,456 B1 * | 3/2001 | Nakao | G06F 17/30719 707/999.003 |
| 7,788,262 B1 | 8/2010 | Shirwadkar | |
| 7,792,842 B2 * | 9/2010 | Goto | G06F 17/30616 707/705 |
| 8,365,059 B2 | 1/2013 | Walsh | |
| 8,370,348 B1 | 2/2013 | Reilly | |
| 9,727,545 B1 | 8/2017 | Segalis et al. | |
| 2007/0219980 A1 | 9/2007 | Songfack | |
| 2009/0006369 A1 * | 1/2009 | Guday | G06F 17/30719 |
| 2009/0077056 A1 | 3/2009 | Ravikumar et al. | |
| 2009/0327896 A1 | 12/2009 | Pall | |
| 2010/0205199 A1 | 8/2010 | Lin et al. | |
| 2010/0228715 A1 | 9/2010 | Lawrence | |
| 2010/0241507 A1 | 9/2010 | Quinn | |
| 2011/0112993 A1 * | 5/2011 | Zhang | G06F 17/3061 706/12 |

(Continued)

FOREIGN PATENT DOCUMENTS

| | | |
|---|---|---|
| WO | 2013/066647 | 5/2013 |
| WO | 2014/035709 | 3/2014 |

OTHER PUBLICATIONS

Extended European Search Report issued in European Application No. 15187865.9 dated Feb. 24, 2016, 8 pages.

(Continued)

*Primary Examiner* — Bruce M Moser
(74) *Attorney, Agent, or Firm* — Fish & Richardson P.C.

(57) ABSTRACT

Methods, systems, and apparatus, including computer programs encoded on a computer storage medium, for receiving a request for information about a term from a user; obtaining, at one or more processors, one or more characteristics of the user; obtaining, at the one or more processors, a template including a plurality of attributes associated with the term; generating, at the one or more processors and based on the one or more characteristics of the user, a response, the response including a respective description for each attribute of the plurality of attributes in the template; and providing for output, data representing the response.

17 Claims, 7 Drawing Sheets

(56) References Cited

U.S. PATENT DOCUMENTS

| | | |
|---|---|---|
| 2011/0282861 A1 | 11/2011 | Bergstraesser |
| 2011/0302162 A1 | 12/2011 | Xiao |
| 2011/0307483 A1 | 12/2011 | Radlinski |
| 2011/0320437 A1 | 12/2011 | Kim |
| 2012/0084667 A1 | 4/2012 | Hickman |
| 2012/0323828 A1 | 12/2012 | Sontag |
| 2013/0007587 A1 | 1/2013 | Marantz |
| 2013/0024768 A1* | 1/2013 | Jeon ................ G06F 17/30719 715/254 |
| 2013/0080266 A1 | 3/2013 | Molyneux |
| 2013/0103683 A1 | 4/2013 | Haveliwala |
| 2013/0144605 A1 | 6/2013 | Brager |
| 2013/0166578 A1 | 6/2013 | Papineni |
| 2013/0187926 A1 | 7/2013 | Silverstein |
| 2013/0212487 A1 | 8/2013 | Cote |
| 2013/0218912 A1 | 8/2013 | Howard et al. |
| 2013/0226995 A1 | 8/2013 | Etheredge |
| 2013/0297590 A1 | 11/2013 | Zukovsky |
| 2014/0067816 A1 | 3/2014 | Kanungo et al. |
| 2014/0136518 A1 | 5/2014 | Shum et al. |
| 2014/0222834 A1* | 8/2014 | Parikh ............... G06F 17/30867 707/748 |
| 2014/0279195 A1* | 9/2014 | Kubicki ............. G06Q 30/0631 705/26.7 |
| 2014/0280055 A1 | 9/2014 | Chang et al. |
| 2014/0298378 A1* | 10/2014 | Kelley ............... H04N 21/8133 725/32 |
| 2015/0356640 A1* | 12/2015 | Flores ................ G06Q 30/0625 705/26.62 |
| 2016/0283585 A1* | 9/2016 | Zheng ............... G06F 17/30675 |

OTHER PUBLICATIONS

Sugiyama et al., "Adaptive Web Search Based on User Profile Constructed without Any Effort from Users," International World Wide Web Conference (WWW2004), May 17, 2004, pp. 675-684.
Non-Final Office Action issued in U.S. Appl. No. 14/096,746, dated Sep. 24, 2015, 21 pages.
Final Office Action issued in U.S. Appl. No. 14/096,746, dated May 16, 2016, 26 pages.
Non-Final Office Action issued in U.S. Appl. No. 14/096,746, dated Nov. 17, 2016, 27 pages.
Notice of Allowance issued in U.S. Appl. No. 14/096,746, dated Apr. 6, 2017, 10 pages.

* cited by examiner

DYNAMIC SUMMARY GENERATOR

TECHNICAL FIELD

This specification relates to content summarization and, according to one particular implementation, relates to generating information about a term.

BACKGROUND

Although online dictionaries exist, manual curation of these dictionaries is painstaking, and makes updates costly and infrequent.

SUMMARY

According to one innovative aspect of the subject matter described in this specification, information about a term can be extracted from various resources, and semantic relations between the term and the information about the term can be automatically determined through automated analysis of the resources. A structured template can be generated based on semantic relations, which provides a summary of descriptions about the term. Specific information in the template can be modified based on one or more characteristics of a user that queries for information about the term. When a user requests information about the term, the specific information in the template is presented to the user.

Another innovative aspect of the subject matter described in this specification includes a process for receiving a request for information about a term from a user; obtaining, at one or more processors, one or more characteristics of the user; obtaining, at the one or more processors, a template including one or more attributes associated with the term; generating, at the one or more processors and based on the one or more characteristics of the user, a response, the response including a respective description for each attribute of the one or more attributes in the template; and providing for output, data representing the response.

These and other embodiments may each optionally include one or more of the following features. For example, to obtain the template including the one or more attributes associated with the term, one or more documents that include the term may be identified from a collection of documents. A respective description that has a semantic relation to the term may be identified for each of the one or more documents. A respective attribute for each respective description may be determined.

To obtain the template including the one or more attributes associated with the term, a template from among a plurality of templates associated with the term may be selected based on the one or more characteristics of the user.

To generate the response, a first description for a particular attribute of the one or more attributes may be obtained. A second description using the first description may be generated based on the one or more characteristics of the user. The response may be generated, where the response may include the second description for the particular attribute. To generate the second description using the first description, one or more first words of the first description may be substituted by one or more second words.

An attribute may be associated with attribute metadata. A description may be associated with description metadata. To obtain the template, one or more attributes may be added to the template based on (i) attribute metadata of the one or more attributes and (ii) the one or more characteristics of the user. To add the one or more attributes to the template, the one or more attributes may be added to the template in response to determining that the attribute metadata of the one or more attributes match the at least one characteristic.

A particular attribute of the one or more attributes may be associated with a plurality of descriptions. To generate the response, a description may be selected from the plurality of descriptions for the particular attribute based on description metadata of the plurality of descriptions and the one or more characteristics of the user.

The process may include receiving, from a second user, a second request for information about the term; obtaining one or more characteristics of the second user; obtaining a second template including one or more attributes associated with the term; generating, based on the one or more characteristics of the second user, a second response, the second response including a respective description for each attribute of the one or more attributes in the second template; and providing for output, data representing the second response. The second template for the second user may be different from the template for the user.

Advantageous implementations may include one or more of the following features. Information about a term can be automatically generated based on semantic relations between the term and information about the term. A template for generating the information can be highly customizable based on a selection of the desirable semantic relations. Information in the template can be modified based on characteristics of a user, which may provide a more relevant and personalized response to the user. The template can be easily applied to other languages because semantic relations between the term and information about the term do not change across different languages. Information about a term that does not have a dictionary meaning can be derived based on semantic relations with other known terms.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Current online dictionaries are one-size-fits-all endeavors. These dictionaries typically do not know what prior knowledge a user has, and while there are manually curated dictionaries for different audiences, e.g., children's dictionaries, college dictionaries, scientific dictionaries, such dictionaries typically are not personalized for a particular user.

To address this deficiency, the present specification describes techniques of generating customized and/or personalized descriptions of terms based on certain characteristics of a user submitting a query. It is common for users to have different levels of reading proficiency and different interests. For example, if a user is a child, it might be desirable to simplify concepts and vocabulary. If a user is a non-native speaker, it might be possible to communicate complicated concepts but still use a simplified vocabulary. If a user is a botanist submitting a query about plants, the response can focus more on plant-aspects of the concept, where applicable. These are just a few examples of how responses can be customized based on user background and interest.

Figure 1A:
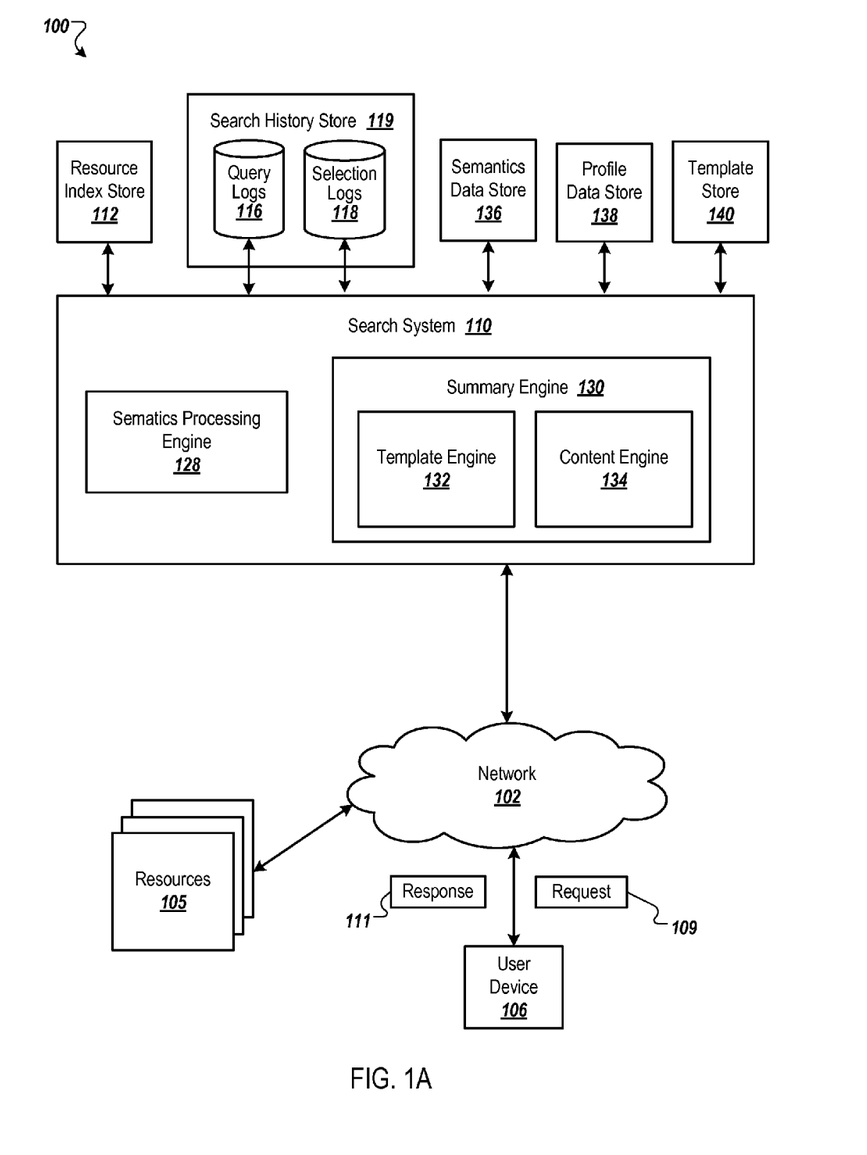
FIG. 1A is a block diagram that illustrates an example system for generating a dynamic summary.

FIG. 1A is a block diagram that illustrates an example system 100 for generating a dynamic summary. Briefly, a user may make a request, e.g., a voice or text query, to obtain a summary of descriptions about a term that interests the user. Based on characteristics of the user, a response that includes a dynamically generated summary of descriptions about the term is provided to the user. A term may be one or more words, phrases, names, signs, or any other forms of data where semantic relations may be established between the term and one or more other terms. The system 100 includes a user device 106, a network 102, resources 105, a search system 110, a resource index store 112, a search history store 119, a semantics data store 136, and a profile data store 138.

The user device 106 can be, for example, a desktop computer, laptop computer, a tablet computer, a wearable computer, a cellular phone, a smart phone, a music player, an e-book reader, a navigation system, a multimodal device such as a wearable computing device, a hybrid gesture recognition/speech recognition system, an automobile information system, a generic home entertainment system, and other appropriate computing device that can send and receive data over the network 102. The functions performed by the user system 106 can be performed by individual computer systems or can be distributed across multiple computer systems. The user device 106 may include a user application, e.g., a browser, to facilitate the sending and receiving of data over the network 102. The browser can enable a user to display and interact with text, images, videos, audio, music and other information typically included in a resource that is accessible over the network 102.

The network 102, such as a local area network (LAN), wide area network (WAN), the Internet, or a combination thereof, connects resources 105, the user device 106, and the search system 110. The system 100 may include many thousands of resources 105 and user devices 106. Although not shown in FIG. 1A, the search system 110 may also connect with one or more of the resource index store 112, the search history store 119, the semantics data store 136, and the profile data store 138 using the network 102.

Resources 105 may be any data accessible over the network 102. For example, the resources 105 may be HTML pages, electronic documents, images files, video files, audio files, and feed sources, to name just a few. In some implementations, the resources 105 may include embedded information, e.g., meta information and hyperlinks, and/or embedded instructions, e.g., client-side scripts. In some implementations, a resource 105 may have a resource address, e.g., a uniform resource locator (URL).

The search system 110 includes a semantics processing engine 128 and a summary engine 130. In general, the search system 110 receives a search request 109 from the user device 106, and provides a response 111 that includes relevant information responsive to the request 109. In some implementations, the request 109 may include a request for a summary of descriptions about a term, and the relevant information in the response 111 may include a dynamically generated summary for the term.

Figure 1B:
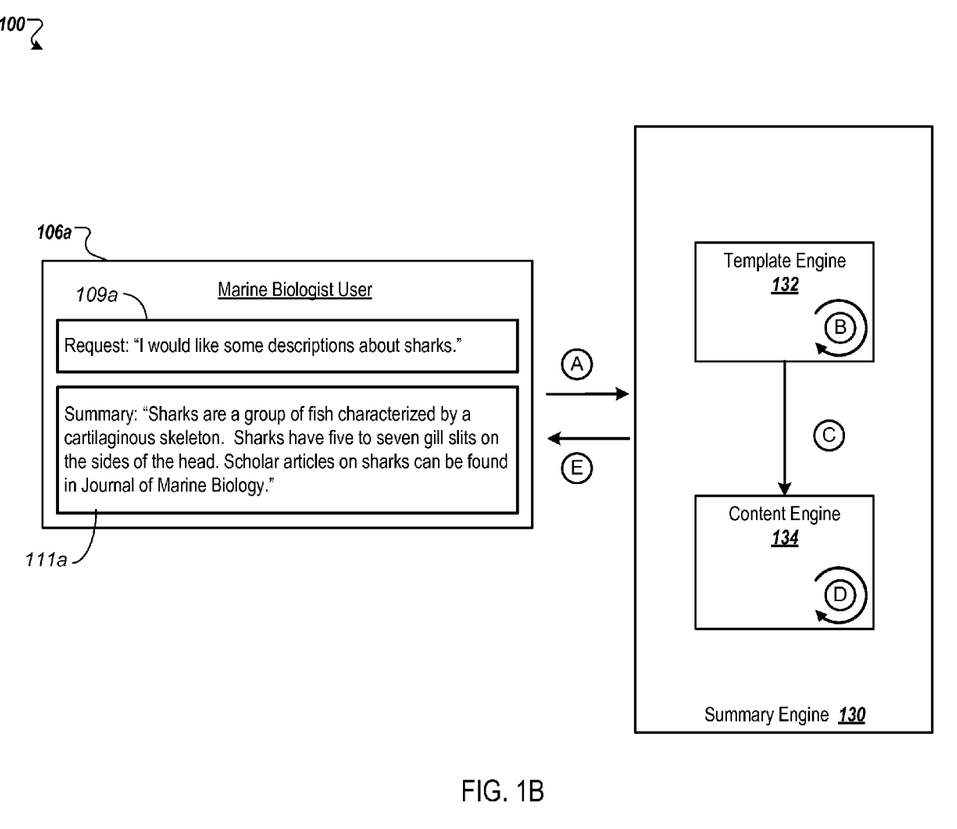
FIG. 1B is a block diagram that illustrates an example system for generating a dynamic summary for a user.
Figure 1C:
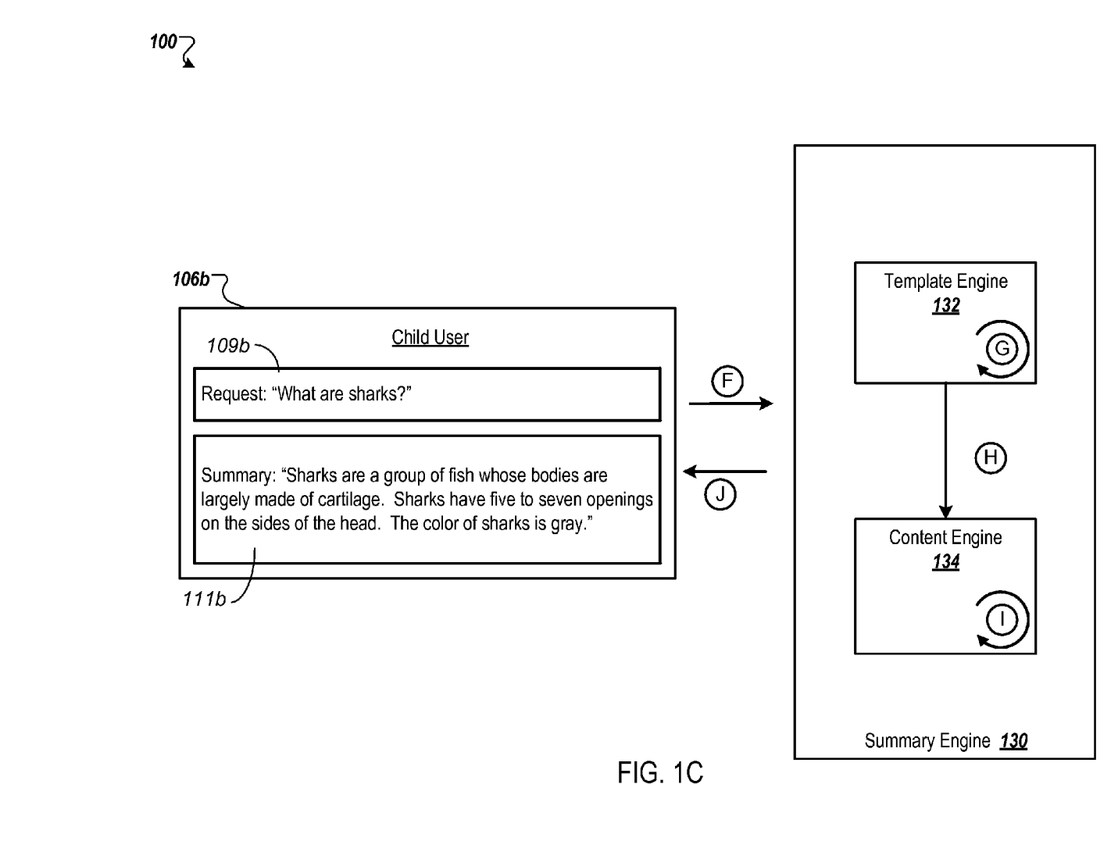
FIG. 1C is a block diagram that illustrates an example system for generating a dynamic summary for a different user.
Figure 1D:
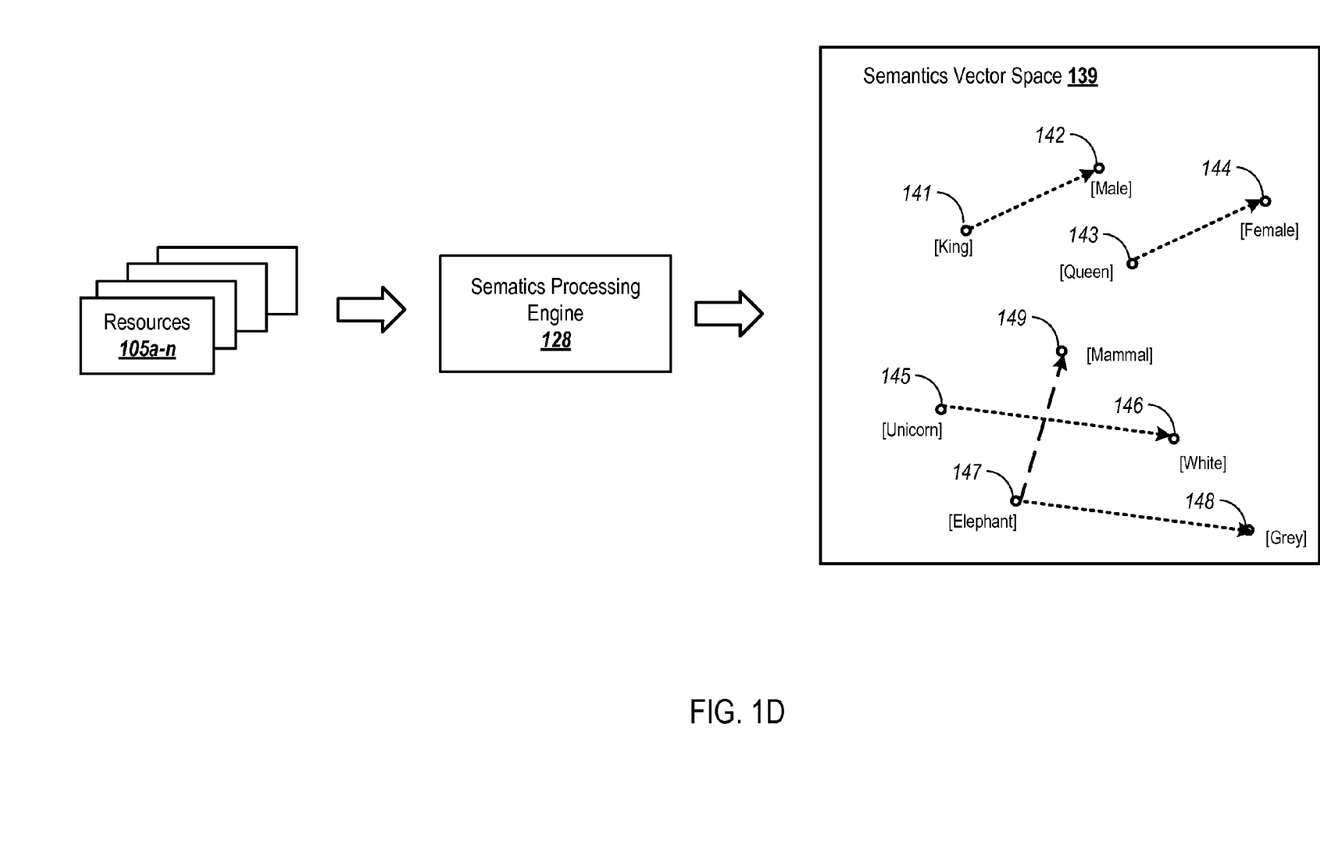
FIG. 1D is a block diagram that illustrates an example system for determining semantic relations.

In general, the semantics processing engine 128 processes the resources 105 to determine semantic relations for terms. In some implementations, the semantics processing engine 128 may determine a semantic relation between a first term and a second term. For example, the semantics processing engine 128 may determine whether the first term is any one of a homonym, a synonym, an antonym, a hypernym, a hyponym, a meronym, a metonym, a holonym, or a paronym of the second term. In some implementations, the semantics processing engine 128 may determine a semantic relation between a term and a category. For example, the semantics processing engine 128 may determine whether the term is a color, a species, a number, a place, an action, or any other categories. In some implementations, the semantics processing engine 128 may store the semantic relations of a term in the semantics data store 136. FIG. 1D provides more detailed descriptions for the determinations of semantic relations for terms.

In general, the summary engine 130 generates a summary of descriptions about a term for a user making the request 109. FIGS. 1B and 1C provide more detailed descriptions on the generation of the summary. The summary engine 130 includes a template engine 132 and a content engine 134. The template engine 132 determines a template for generating the summary. A template includes one or more attributes associated with the term. An example of an attribute may be a semantic relation between the term and a description of the attribute.

In some implementations, the template engine 132 may access a template from the template store 140 based on the term. In some implementations, the template engine 132 may access and/or modify a template from the template store 140 based on the search history of the user. In some implementations, the template engine 132 may access and/or modify a template based on the characteristics of the user. In some implementations, the template engine 132 may generate a template based on semantic relations associated with the term. In some implementations, the template engine 132 may store a template in the template store 140.

The content engine 134 generates content to be included in the template. For example, the content engine 134 may generate a respective description for each attribute of the one or more attributes in the template. In some implementations, the content engine 134 may access content from the semantics data store 136. For example, an attribute in the template provided by the template engine 132 may specify a semantic relation between the term and a description stored in the semantics data store 136. The content engine 134 may access the description based on the specified semantic relation.

In some implementations, the content engine 134 may revise content associated with the term based on a characteristic of the user. For example, if the user is a child, the content engine 134 may revise a description to include easier explanations that represent the description.

In general, the search history store 119 stores data from and related to previous search requests associated with users. The search history store 119 includes the query logs 116 and the selection logs 118. The search query logs 116 store search requests 109 submitted from user devices 106. The selection logs 118 store data referencing actions taken responsive to search results provided by the search system 110. In some implementations, the search system 110 may use the selection logs 118 and query logs 116 to determine the respective sequences of requests 109 submitted by the user devices 106, and the actions taken in response to the requests 109.

In some implementations, to facilitate searching of the resources 105, the search system 110 may identify the resources by crawling and indexing the resources 105. The index data may be stored in a resource index 112. In response to a search request received from the user device 106, the search system 110 may use the resource index 112 to identify resources 105 that are responsive to the search request.

In general, the semantics data store 136 stores data representing attributes and descriptions associated with a term. In some implementations, an attribute may be a semantic relation between a term and a related description. For example, an attribute for a term "X" may be "X is a type of Y," indicating that the term "X" is a hyponym of a description "Y." As another example, another attribute for the term "X" may be "X is Z," indicating that the term "X" is a synonym of a description "Z." As another example, another attribute for the term "X" may be "scholar articles about X can be found in K," indicating that the term "X" is in a category "scholar articles."

In some implementations, the semantics data store 136 may store attribute metadata that are associated with an attribute. For example, for the attribute "X is a type of Y," a corresponding attribute metadata "Semantics" may include a value "Hyponym." As another example, for the attribute "scholar articles about X can be found in K," a corresponding attribute metadata "Education Level" may include a value of "University."

In some implementations, the semantics data store 136 may store description metadata that are associated with a description. For example, for the description "fish" in the attribute "shark is a type of fish," a corresponding description metadata "age group" may include a value "all." As another example, for the description "Journal of Marine Biology" in the attribute "scholar articles about sharks can be found in the Journal of Marine Biology," a corresponding attribute metadata "age group" may include a value of "eighteen and above."

In general, the profile data store 138 stores data representing one or more characteristics of users operating user devices 106. Examples of characteristics may include an age or an age group of the user, an education level of the user, an interest of the user, a gender of the user, an activity history of the user, or any other characteristics of the user. In situations in which the systems discussed here collect personal information about users, or may make use of personal information, the users may be provided with an opportunity to control whether programs or features collect user information, or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and stored in the profile data store 138.

In general, the template store 140 stores templates for generating a summary. In some implementations, a template may be manually generated and then stored to allow access by the template engine 132. In some implementations, a template may be automatically generated by the template engine 132 or another engine. In some implementations, a template may be associated with a particular term. For example, a specific template may be created for the term "shark." In some implementations, a template may be associated with terms belonging to a group. For example, a specific template may be created for the group "marine animals" that can be used for the terms "shark," "fish," "turtle," or any other terms that satisfy the definition of this group. In some implementations, a template may be associated with a user characteristic. For example, a specific template may be created for the age group "kids" that can be used when the requester's age satisfies the definition of this age group.

FIG. 1B illustrates an example system 100 for generating a dynamic summary for a user of a user device 106a, including an example flow of data shown in stages (A) to (E). Stages (A) to (E) may occur in the illustrated sequence, or they may occur in a sequence that is different than in the illustrated sequence. In some implementations, one or more of the stages (A) to (E) may occur offline, where the search system 110 may perform computations when the user device 106a is not connected to the network 102.

During stage (A), a first user operating a user device 106a submits a request 109a "I would like some descriptions about sharks" to the search system 110. In some implementations, the search system 110 may parse the request to determine that the first user is interested in a summary of descriptions about the term "shark" before sending the term to the summary engine 130.

During stage (B), the template engine 132 obtains a template for the first user. In some implementations, if the template store 140 stores a specific template for the term "shark" that has been previously generated, the template engine 132 may obtain the specific template. In some other implementations, if the template store 140 does not store a specific template for the term "shark", the template engine 132 may obtain a generic template that is associated with any term. Here, the template engine 132 obtains a template for "marine animals" that includes attributes "X are a group of Y" and "X have Z," where X is the term, and Y and Z are the descriptions stored in the semantics data store 136.

In some implementations, the template engine 132 may identify one or more characteristics of the user. For example, the characteristics of the first user may be transmitted by the user device 106 in the request 109a. As another example, the template engine 132 may obtain the characteristics of the first user from the profile data store 138. In this example, the template engine 132 identifies that the occupation of the first user is a marine biologist.

In some implementations, the template engine 132 may add, substitute, or remove one or more attributes in the template based on the characteristics of the user. Here, the template engine 132 identifies that the occupation of the first user is a marine biologist, and adds an attribute "scholar articles about X can be found in K" because the education background of the first user satisfies the attribute metadata "Education Level."

During stage (C), the template engine 132 transmits the generated template to the content engine 134.

During stage (D), the content engine 134 identifies a respective description for each of the attributes in the template. In some implementations, the content engine 134 identifies a description for an attribute from the semantics data store 136. For example, for an attribute "X are a group of Y," the semantic distance between X and Y may be specified by the corresponding semantic relation. The content engine 134 may obtain the description Y for the attribute "shark is Y" based on the specified semantic distance. Here, the content engine 134 identifies the descriptions that correspond to the attributes in the template: "Sharks are a group of fish characterized by a cartilaginous skeleton," "Sharks have five to seven gill slits on the sides of the head," and "Scholar articles on sharks can be found in Journal of Marine Biology."

In some implementations, the content engine 134 may modify one or more of the descriptions based on the description metadata of the descriptions and the characteristics of the user. Here, the content engine 134 determines not to modify the descriptions because the education level of the first user satisfies the values in the description metadata. In some implementations, the content engine 134 aggregates these descriptions and generate a summary for the term "shark."

During stage (E), the content engine 134 transmits data including the dynamically generated summary 111a of the term "shark" to the user device 106a. In some implementations, the data may further include data representing one or more resources 105 that are responsive to the request, such as titles, snippets of text extracted from the resources, and resource locators for the resources.

FIG. 1C illustrates an example system 100 for generating a dynamic summary for another user of a user device 106b, including an example flow of data shown in stages (F) to (J). Stages (F) to (J) may occur in the illustrated sequence, or they may occur in a sequence that is different than in the illustrated sequence. In some implementations, one or more of the stages (F) to (J) may occur offline, where the search system 110 may perform computations when the user device 106b is not connected to the network 102.

During stage (F), a second user operating a user device 106b submits a request 109b "What are sharks?" to the search system 110. In some implementations, the search system 110 may parse the request to determine that the second user is interested in a summary of descriptions about the term "shark" before sending the term to the summary engine 130.

During stage (G), the template engine 132 obtains a template for the second user. Here, the template engine 132 obtains a template for "marine animals" that includes attributes "X are a group of Y" and "X have Z," where X is the term, and Y and Z are the descriptions stored in the semantics data store 136.

In this example, the template engine 132 then identifies one or more characteristics of the second user, where the age group of the second user is a child. In some implementations, the template engine 132 may add, substitute, or remove one or more attributes in the template based on the characteristics of the user. Here, the template engine 132 identifies that the second user may be a child, and adds an attribute "The color of X is K" because the age group of the second user satisfies the attribute metadata "age group."

During stage (H), the template engine 132 transmits the generated template to the content engine 134.

During stage (I), the content engine 134 identifies a respective description for each of the attributes in the template. Here, the content engine 134 identifies there descriptions that correspond to the attributes in the template: "Sharks are a group of fish characterized by a cartilaginous skeleton," "Sharks have five to seven gill slits on the sides of the head," and "The color of sharks is gray."

In some implementations, the content engine 134 may modify one or more of the descriptions based on the description metadata of the descriptions and the characteristics of the user. Here, the content engine 134 determines to revise the description "sharks are a group of fish characterized by a cartilaginous skeleton" because the age group of the second user does not satisfy a value in the description metadata. The content engine 134 modifies the description to "Sharks are a group of fish whose bodies are largely made of cartilage." Similarly, the content engine 134 determines to revise the description "Sharks have five to seven gill slits on the sides of the head" because the age group of the second user does not satisfy a value in the description metadata. The content engine 134 modifies the descriptions to "Sharks have five to seven openings on the sides of the head." The content engine 134 determines not to revise the description "The color of sharks is gray" because the age group of the second user satisfies a value in the description metadata. The content engine 134 then aggregates these revised descriptions and generates a summary for the term "shark" for the second user.

During stage (J), the content engine 134 transmits data including the dynamically generated summary of the term "shark" to the user device 106b. In some implementations, the data may further include data representing one or more resources 105 that are responsive to the request, such as titles, snippets of text extracted from the resources, and resource locators for the resources.

FIG. 1D illustrates an example system 100 for determining semantic relations. Note that the scope of the disclosure should not be limited to the example given here, as there may be other suitable systems and methods for determining semantic relations which can be applied to the application of this disclosure.

In some implementations, the search system 110 may crawl and index the resources 105a-n. During crawling, the semantics processing engine 128 may determine semantic relations for words in the resources 105a-n. For example, a resource 105a may include a phrase "a king is a male." The semantics processing engine 128 may determine the semantic relation between the words "king" and "male" by mapping each word to corresponding vectors 141 and 142 in a semantics vector space 139. The semantics vector space 139 may be an n-dimensional vector space, where n may be any positive integer. In some implementations, the semantics processing engine 128, or another engine, may calculate a cosine distance between the vectors 141 and 142. The cosine distance between the vectors 141 and 142 may be used to establish the semantic relation between the words "king" and "male."

In some implementations, the semantics processing engine 128 may designate this cosine distance as the cosine distance corresponding to an attribute "hyponym" ("X is Y.") for a term X. A different resource 105b may include a phrase "a queen is a female." The semantics processing engine 128 may map the terms "queen" and "female" to vectors 143 and 144 in the semantics vector space 139. The semantics processing engine 128 may determine that a cosine distance between the vectors 143 and 144 is equal to the cosine distance between the vectors 141 and 142. In response to determining that the cosine distance between the vectors 143 and 144 is equal to the cosine distance between the vectors 141 and 142, the semantics processing engine 128 may determine that the term "queen" is a hyponym of the term "female."

As another example, a resource 105c may include a phrase "the color of a unicorn is white." The semantics processing engine 128 may map the terms "unicorn" and "white" to vectors 145 and 146 in the semantics vector space 139. The semantics processing engine 128 may determine that a cosine distance between the vectors 145 and 146, and designate this cosine distance as corresponding to an attribute "color." A resource 105d may include a phrase "a gray elephant is in the mammal family." The semantics processing engine 128 may map the terms "elephant" and "gray" to vectors 147 and 148 in the semantics vector space 139. The semantics processing engine 128 may determine that a cosine distance between the vectors 147 and 148 is equal to the cosine distance between the vectors 145 and 146. In response to determining that the cosine distance between the vectors 147 and 148 is equal to the cosine distance between the vectors 145 and 146, the semantics processing engine 128 may determine that the term "gray" is a color of the term "elephant."

The semantics processing engine 128 may also map the term "mammal" to a vector 149 in the semantics vector space 139. The semantics processing engine 128 may determine that a cosine distance between the vectors 147 and 149, and designate this cosine distance as corresponding to an attribute "family."

In some implementations, the semantics processing engine 128 may assign one or more values to attribute metadata of an attribute. In some implementations, the semantics processing engine 128 may assign one or more values to description metadata of a description. In some implementations, the semantics processing engine 128 may store the attribute metadata, the description metadata, and the data corresponding to the vectors in the semantics vector space 139 in the semantics data store 136.

Figure 2:
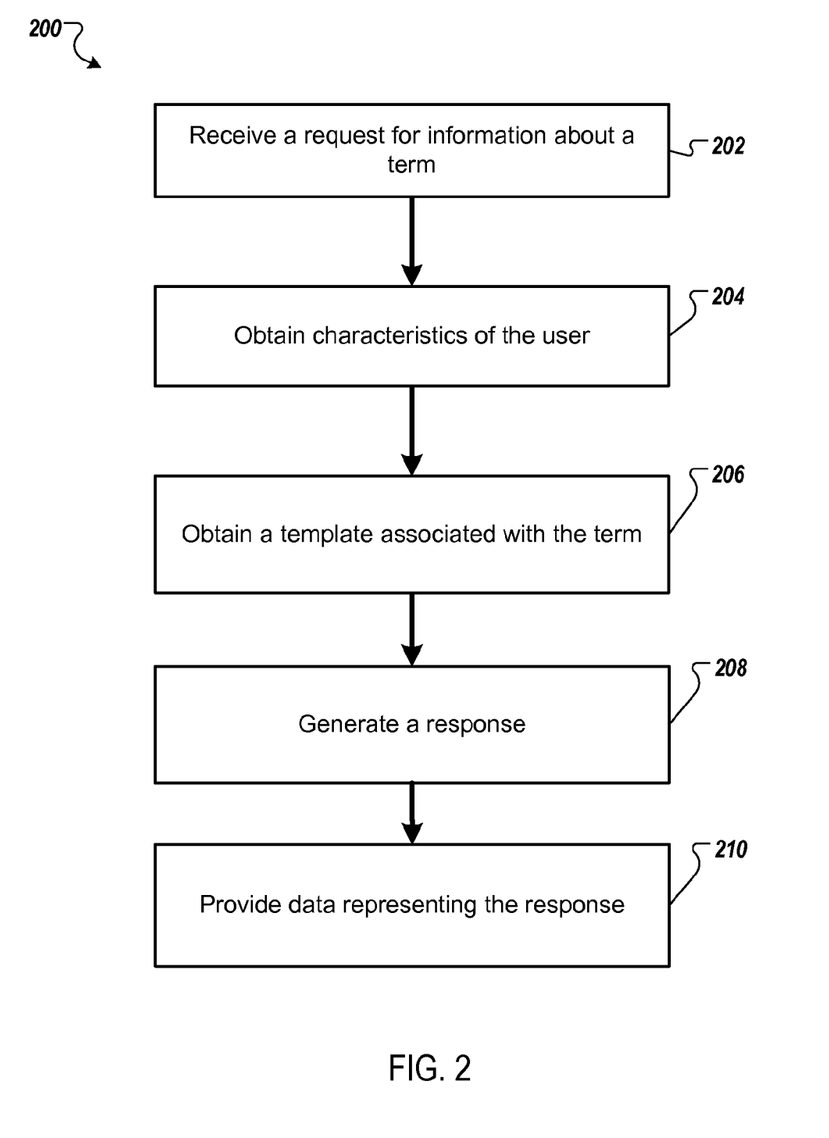
FIG. 2 is a diagram that illustrates an example process for generating a dynamic summary.

FIG. 2 is a diagram that illustrates an example process 200 for generating a dynamic summary. The process 200 may be performed by a system, such as the search system 120 described above or by other systems, including combinations of multiple computing systems.

The system receives a request for information about a term from a user (202). For example, a first user operating a user device 106a may submit a request 109a "I would like some descriptions about sharks" to the search system 110.

The system obtains one or more characteristics of the user (204). For example, the characteristics of the first user may be transmitted by the user device 106 in the request 109a. As another example, the template engine 132 may obtain the characteristics of the first user from the profile data store 138.

The system obtains a template associated with the term (206). For example, the template engine 132 may obtain a template for "marine animals" that includes attributes "X are a group of Y" and "X have Z," where X is the term, and Y and Z are the descriptions stored in the semantics data store 136.

In some implementations, the system may identify, from a collection of documents, one or more documents that include the term. For example, the term "shark" may be included in a resource 105. The system may identify, for each of the one or more documents, a respective description that has a semantic relation to the term. For example, the semantics processing engine 128 may identify that the resource 105 includes a phrase "Sharks have five to seven gill slits on the sides of the head," and may determine that the phrase "five to seven gill slits on the sides of the head" is a description. The system may determine a respective attribute for each respective description. For example, the semantics processing engine 128 may determine that "X have Z" is an attribute associated with the term "shark" and the description "five to seven gill slits on the sides of the head."

In some implementations, the system may select a template from among a plurality of templates associated with the term based on the one or more characteristics of the user. For example, the template engine 132 may obtain a template for the first user in response determining that the first user is a marine biologist.

In some implementations, an attribute is associated with attribute metadata, and a description is associated with description metadata. For example, For example, for an attribute "X is a type of Y," an associated attribute metadata may be "hyponym." As another example, for the description "a group of fish characterized by a cartilaginous skeleton" an associated description metadata may be "high school education."

In some implementations, the system may add one or more attributes to the template based on (i) attribute metadata of the one or more attributes and (ii) the one or more characteristics of the user. In some implementations, the system may add the one or more attributes to the template in response to determining that the attribute metadata of the one or more attributes match the at least one characteristic. For example, the template engine 132 may identify that the occupation of the first user is a marine biologist, and may add an attribute "scholar articles about X can be found in K" to the template because the education background of the first user satisfies the attribute metadata "Education Level."

The system generates a response (208). For example, the content engine 134 may aggregate descriptions and generate a summary for the term "shark" for the first user.

In some implementations, the system may obtain a first description for a particular attribute of the one or more attributes. For example, the content engine 134 may obtain the description "Sharks have five to seven gill slits on the sides of the head." The system may generate a second description using the first description based on the one or more characteristics of the user. In some implementations, the system may substitute one or more first words of the first description by one or more second words. For example, the content engine 134 may modify the description to "Sharks have five to seven openings on the sides of the head." The system may generate the response, where the response includes the second description for the particular attribute. For example, the content engine 134 may aggregate the revised descriptions and generate a summary for the term "shark" for the second user.

In some implementations, a particular attribute of the one or more attributes may be associated with a plurality of descriptions. For example, the attribute "shark is Y" may include descriptions such as "fast," "aggressive," etc. The system may selecting a description from the plurality of descriptions for the particular attribute based on description metadata of the plurality of descriptions and the one or more characteristics of the user. For example, the content engine 134 may select the description that satisfies the age group of the second user.

The system provides data representing the response (210). For example, the content engine 134 transmits data including the dynamically generated summary of the term "shark" to the user device 106.

In some implementations, the system may receive from a second user, a second request for information about the term. For example, a second user operating a user device 106b may submit a request 109b "What are sharks?" to the search system 110. The system may obtain one or more characteristics of the second user. For example, the summary engine 130 may identify that the second user is a child. The system may obtain a second template including one or more attributes associated with the term. For example, the template engine 132 may identify that the second user may be a child, and add an attribute "The color of X is K" because the age group of the second user satisfies the attribute metadata "age group." The system may generate, based on the one or more characteristics of the second user, a second response, the second response including a respective description for each attribute of the one or more attributes in the second template. For example, the content engine 134 may aggregate the revised descriptions and generate a summary for the term "shark" for the second user. The system may provide for output, data representing the second response. For example, the content engine 134 may transmit data including the dynamically generated summary of the term "shark" to the user device 106b.

Figure 3:
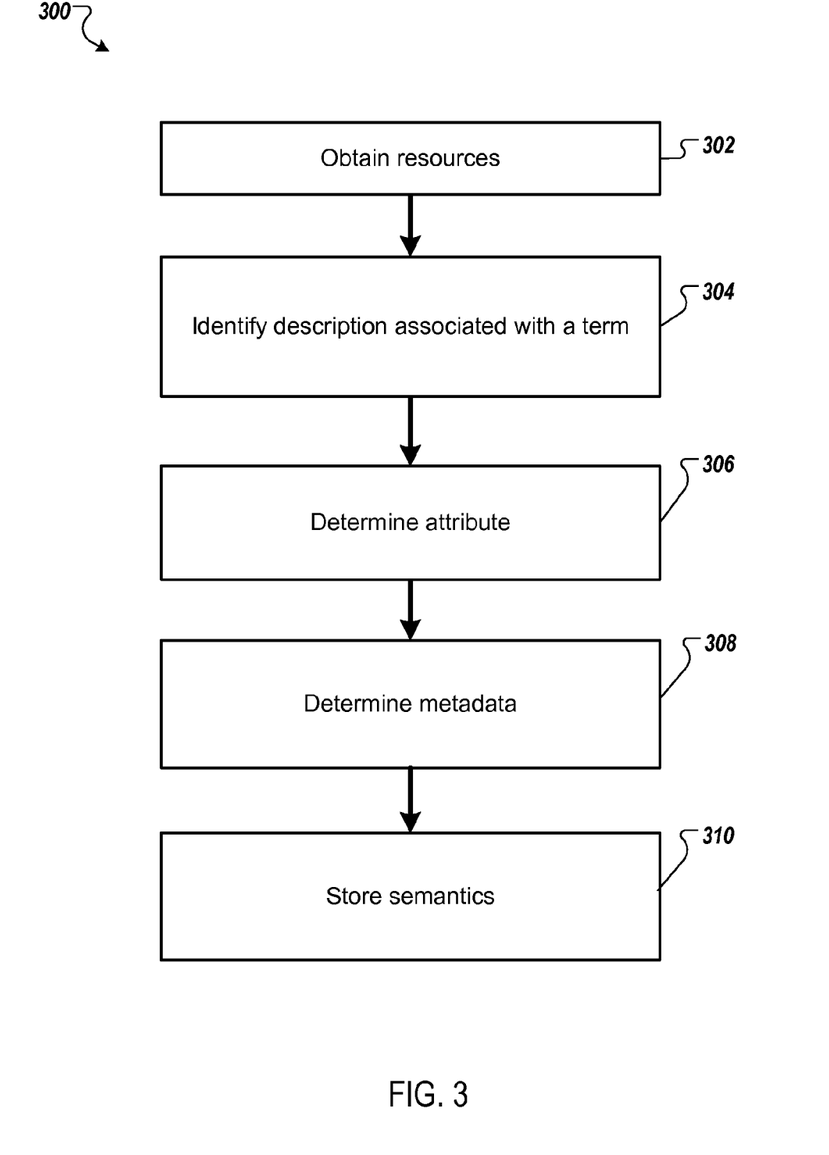
FIG. 3 is a diagram that illustrates an example process for determining semantic relations.

FIG. 3 is a diagram that illustrates an example process 300 for determining semantic relations. The process 300 may be performed by a system, such as the search system 120 described above or by other systems, including combinations of multiple computing systems.

The system obtains resources (302). For example, the semantics processing engine 128 may crawl the resources 105.

The system identifies description associated with a term (304). For example, a resource 105a may include a phrase "a king is a male." The semantics processing engine 128 may determine that the description "male" is associated with the term "king."

The system determines one or more attributes for the term (306). For example, the semantics processing engine 128 may determines an attribute "hyponym" for the term "king" from the phrase "a king is a male."

The system determines metadata for the term (308). For example, the semantics processing engine 128 may designate a value "hyponym" as attribute metadata to the "king."

The system stores semantic relations (310). For example, the semantics processing engine 128 may store the attribute metadata, the description metadata, and the data corresponding to the vectors in the semantics vector space 139 in the semantics data store 136.

Figure 4:
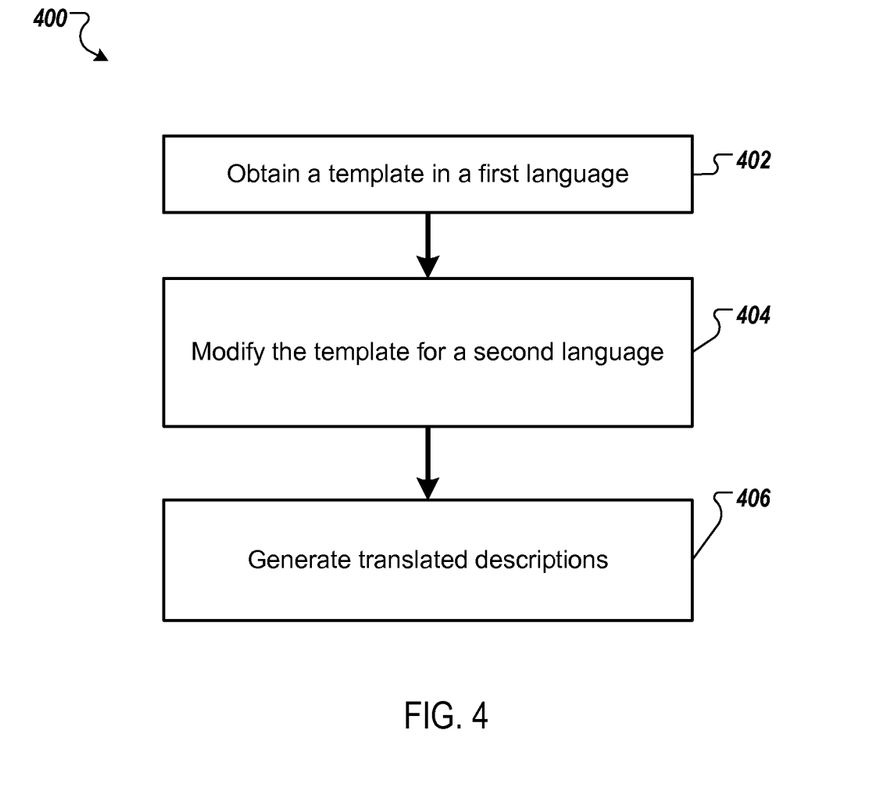
FIG. 4 is a diagram that illustrates an example process for internationalizing a summary template.

FIG. 4 is a diagram that illustrates an example process 400 for internationalizing a summary template. The process 400 may be performed by a system, such as the search system 120 described above or by other systems, including combinations of multiple computing systems.

The system obtains a template in a first language (402). For example, the template engine 132 may access a template in a first language from the template store 140.

The system modifies the template for a second language (404). In general, since semantic relations are independent of languages, the system may revise the template in the first language to fit the linguistic rules of the second language.

The system generates translated descriptions (406). For example, the content engine 134 may access the semantic data store 136 to obtain a description in the first language that correspond to an attribute in the template. The content engine 134 or another engine may translate the description in the first language into the second language.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

As used in this specification, an "engine" (or "software engine") refers to a software implemented input/output system that provides an output that is different from the input. An engine can be an encoded block of functionality, such as a library, a platform, a Software Development Kit ("SDK"), or an object.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
receiving a request for information about a term from a user;
obtaining, at one or more processors, one or more first characteristics of the user;
obtaining, at the one or more processors, a template including one or more attributes associated with the term;
generating, at the one or more processors and based on the one or more first characteristics of the user, a response, the response including a respective description for each attribute of the one or more attributes in the template, wherein generating the response comprises:
  obtaining a first description for a particular attribute of the one or more attributes, wherein the first description is associated with data identifying a value that describes a particular characteristic of a group of users;
  determining, based on the data identifying the value that describes the particular characteristic of the group of users and the one or more first characteristics of the user, that the first description should not be provided to the user;
  generating a second description that should be provided to the user from the first description based on determining that the first description should not be provided to the user; and
  generating the response, wherein the response includes the second description for the particular attribute; and
providing for output, data representing the response.

2. The method of claim 1, wherein obtaining the template including the one or more attributes associated with the term comprises:
identifying, from a collection of documents, one or more documents that include the term;
identifying, for each of the one or more documents, a respective description that has a semantic relation to the term; and
determining a respective attribute for each respective description.

3. The method of claim 1, wherein obtaining the template including the one or more attributes associated with the term comprises:

selecting a template from among a plurality of templates associated with the term based on the one or more first characteristics of the user.

4. The method of claim 1, wherein generating the second description from the first description comprises substituting one or more first words of the first description by one or more second words.

5. The method of claim 1, wherein at least one of the one or more attributes is associated with attribute metadata, and wherein at least one of the descriptions is associated with description metadata.

6. The method of claim 5, wherein obtaining the template comprises adding one or more attributes to the template based on (i) attribute metadata of the one or more attributes and (ii) the one or more first characteristics of the user.

7. The method of claim 6, wherein adding the one or more attributes to the template comprises adding the one or more attributes to the template in response to determining that the attribute metadata of the one or more attributes match the one or more first characteristics.

8. The method of claim 1, comprising:
receiving, from a second user, a second request for information about the term;
obtaining one or more second characteristics of the second user;
obtaining a second template including one or more attributes associated with the term;
generating, based on the one or more second characteristics of the second user, a second response, the second response including a respective description for each attribute of the one or more attributes in the second template; and
providing for output, data representing the second response.

9. The method of claim 8, wherein the second template for the second user is different from the template for the user.

10. The method of claim 1, wherein the one or more first characteristics of the user includes an age of the user, an education level of the user, an interest of the user, a gender of the user, or a search history of the user.

11. A non-transitory, computer-readable medium storing software having stored thereon instructions, which, when executed by one or more computers, cause the one or more computers to perform operations of:
receiving a request for information about a term from a user;
obtaining, at one or more processors, one or more first characteristics of the user;
obtaining, at the one or more processors, a template including one or more attributes associated with the term;
generating, at the one or more processors and based on the one or more first characteristics of the user, a response, the response including a respective description for each attribute of the one or more attributes in the template, wherein generating the response comprises:
obtaining a first description for a particular attribute of the one or more attributes, wherein the first description is associated with data identifying a value that describes a particular characteristic of a group of users;
determining, based on the data identifying the value that describes the particular characteristic of the group of users and the one or more first characteristics of the user, that the first description should not be provided to the user;
generating a second description that should be provided to the user from the first description based on determining that the first description should not be provided to the user; and
generating the response, wherein the response includes the second description for the particular attribute; and
providing for output, data representing the response.

12. The computer-readable medium of claim 11, wherein obtaining the template including the one or more attributes associated with the term comprises:
identifying, from a collection of documents, one or more documents that include the term;
identifying, for each of the one or more documents, a respective description that has a semantic relation to the term; and
determining a respective attribute for each respective description.

13. The computer-readable medium of claim 11, wherein obtaining the template including the one or more attributes associated with the term comprises:
selecting a template from among a plurality of templates associated with the term based on the one or more first characteristics of the user.

14. A system comprising:
one or more processors and one or more computer storage media storing instructions that are operable, when executed by the one or more processors, to cause the one or more processors to perform operations comprising:
receiving a request for information about a term from a user;
obtaining, at one or more processors, one or more first characteristics of the user;
obtaining, at the one or more processors, a template including one or more attributes associated with the term;
generating, at the one or more processors and based on the one or more first characteristics of the user, a response, the response including a respective description for each attribute of the one or more attributes in the template, wherein generating the response comprises:
obtaining a first description for a particular attribute of the one or more attributes, wherein the first description is associated with data identifying a value that describes a particular characteristic of a group of users;
determining, based on the data identifying the value that describes the particular characteristic of the group of users and the one or more first characteristics of the user, that the first description should not be provided to the user;
generating a second description that should be provided to the user from the first description based on determining that the first description should not be provided to the user; and
generating the response, wherein the response includes the second description for the particular attribute; and
providing for output, data representing the response.

15. The system of claim 14, wherein obtaining the template including the one or more attributes associated with the term comprises:
identifying, from a collection of documents, one or more documents that include the term;

identifying, for each of the one or more documents, a respective description that has a semantic relation to the term; and determining a respective attribute for each respective description.

16. The system of claim 14, wherein obtaining the template including the one or more attributes associated with the term comprises:

selecting a template from among a plurality of templates associated with the term based on the one or more first characteristics of the user.

17. The method of claim 1, further comprising:

receiving, from a second user, a second request for information about the term;

obtaining one or more second characteristics of the second user;

obtaining a second template including one or more second attributes associated with the term;

generating, at the one or more processors and based on the one or more second characteristics of the second user, a response, the response including a respective description for each particular attribute of the one or more second attributes in the second template, wherein generating the response comprises:

obtaining a first description for the particular attribute of the one or more second attributes of the second template, wherein the first description is associated with data identifying a second value that describes a particular characteristic of a second group of users;

determining, based on the data identifying the second value that describes the particular characteristic of the second group of users and the one or more second user characteristics of the second user, that the first description for the particular attribute of the one or more second attributes of the second template should be provided to the second user;

generating the response using the first description for the particular attribute of the one or more second attributes of the second template; and providing for output, data representing the response.

* * * * *